May 27, 1924.
A. L. HARVEY
MOTOR CONTROL SYSTEM
Filed March 13, 1920
1,495,790
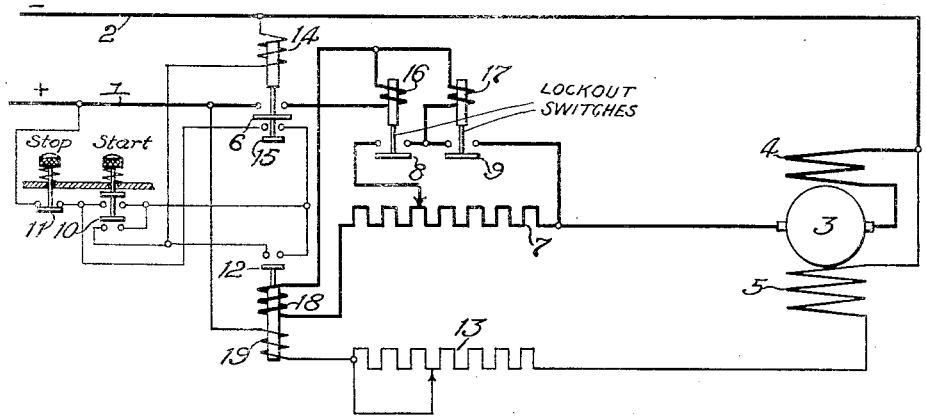
WITNESSES:
INVENTOR
Albert L. Harvey
BY
ATTORNEY Patented May 27, 1924.

1,495,790

UNITED STATES PATENT OFFICE.

ALBERT L. HARVEY, OF WILKINSBURG, PENNSYLVANIA, ASSIGNOR TO WESTINGHOUSE ELECTRIC & MANUFACTURING COMPANY, A CORPORATION OF PENNSYLVANIA.

MOTOR-CONTROL SYSTEM.

Application filed March 13, 1920. Serial No. 365,498.

*To all whom it may concern:*

Be it known that I, ALBERT L. HARVEY, a citizen of the United States, and a resident of Wilkinsburg, in the county of Allegheny and State of Pennsylvania, have invented a new and useful Improvement in Motor-Control Systems, of which the following is a specification.

My invention relates to motor-control systems and it has particular relation to such systems as are employed in connection with adjustable-speed, direct-current motors.

My invention has, for its object, to provide a highly sensitive relay for protecting a motor-control system from a failure of excitation of the shunt field magnet winding during the operation of the motor.

In such systems as have heretofore been proposed, relays have been employed which are actuated by the current traversing the field-magnet windings of the motor. It has been found that such relays are not sufficiently sensitive to protect the system from abnormal currents or increase of speed caused by a hazardous reduction of the motor field excitation.

According to my present invention, I propose a relay for controlling the main motor circuit, which is provided with two actuating coils. One coil is energized in accordance with the current traversing the motor circuit and the other coil is energized in accordance with the magnetization of the motor field. The relay is initially actuated to its closed position by means of the coil that derives its energy from the main motor current which is subsequently rendered ineffective to maintain the relay in its closed position. The second coil is effective to maintain the relay in its closed position so long as the field exciting current exceeds a predetermined value.

The single figure of the accompanying drawing is a diagrammatic view of a control system embodying my invention.

Referring particularly to the drawing, line conductors 1 and 2 supply electrical energy to a motor, the armature of which is indicated at 3 and which has a series field-magnet winding 4 and a shunt field-magnet winding 5, through a main-line switch 6. A starting resistor 7 is controlled by lock-out accelerating switches 8 and 9.

The operation of the motor is controlled by means of a set of push-button switches 10 and 11 which are respectively adapted to start and stop the operation of the motor, as indicated by the legends adjacent to the respective switches. A protective relay 12 is adapted to interrupt the main circuit of the motor when the energization of the field-magnet winding 5 decreases to a predetermined minimum value.

The speed of operation of the motor is adjusted by means of a field rheostat 13 that is included in the circuit of the field-magnet winding 5.

The main line switch 6 has an actuating coil 14 and an interlock 15 that closes when the switch 6 closes to establish a holding circuit therefor.

The accelerating switches 8 and 9 are assumed to be lockout switches of a type for automatically effecting the acceleration of the motor. Current coils 16 and 17 constitute the actuating coils for the respective accelerating switches 8 and 9.

The protective relay 12 has a current coil 18 that assists in the initial actuation of the relay 12 and a coil 19 that is connected in series with the shunt field-magnet winding 5. The coil 19 is so designed that its energization by the current normally traversing the field-magnet winding circuit is insufficient to initially close the relay 12 with effectiveness and centainty but which is sufficient to maintain the relay closed after the same has been actuated by the assistance of current coil 18. The series actuating coil 18 assists in the initial operation of the relay 12, as hereinafter fully described.

In order to operate the system illustrated in the drawing, the operator depresses push-button switch 10 to close the main line switch 6 by establishing a circuit from line conductor 1 through push-button switch 11, both contactors in series of the double-pole switch 10, and the actuating coil 14 of the line switch 6 to the supply-circuit conductor 2. The energization of coil 14 effects the closing of the line switch to initiate the operation of the motor.

The initial current which traverses the main motor circuit also traverses the actuating coil 18 of the relay 12 to provide means for assisting the coil 19, which is energized by the current traversing the field-magnet winding, to positively close the relay 12. When the relay 12 closes, it completes a holding circuit for the coil 14, the circuit extending from the positive side of the supply circuit, through push-button switch 11, line switch interlock 15, relay 12 and coil 14, to the negative side of the supply circuit. The push-button switch 10 may now be released.

The initial rush of current through the motor circuit maintains the lockout accelerating switch 8 open until the current decreases to a predetermined value. The accelerating switch 8 closes to complete a circuit for bridging a portion of the starting resistor 7 and the current coil 18 of the relay 12. The shunting of the portion of the starting resistor 7 effects an increase in the speed of operation of the motor 2 and in the motor current.

The lockout switch 9 closes to shunt the remainder of the starting resistor when the current traversing its actuating coil 17 decreases to a predetermined minimum value. The motor now accelerates to its maximum speed of operation for a fixed position of its field rheostat 13. Further changes in the speed of operation of the motor may be effected by adjusting the field rheostat 13.

The closing of switch 9 also bridges actuating coil 18 of the relay 12 to render the coil 18 ineffective in maintaining the relay 12 in its actuated position. During running conditions, therefore, the coil 19 alone maintains the relay closed.

If the current traversing the circuit of the field-magnet winding 5 and the relay coil 19 decreases to a dangerous value, the relay 12 opens to interrupt the main motor circuit by interrupting the circuit of the actuating coil 14 of the main line switch 6.

The energization necessary to initially close a relay, such as that employed in applicant's system as a field protective relay 12, is much greater than the energization required to maintain the relay closed after it has initially been actuated. In order to provide a relay which is sufficiently sensitive to protect the motor circuit from the dangers that arise when the energization of the field-magnet winding decreases to a predetermined low value, the relay must respond to relatively small changes in the value of the current traversing the motor field-magnet winding. Since the current traversing the motor field-magnet winding also traverses the coil 19 that maintains the relay closed, the capacity of the coil 19 must be sufficient to conduct the maximum current for energizing the field-magnet winding 5 during low-speed or full-field operation of the motor.

By providing a current coil 18, which assists in the initial operation of the relay 12, the coil 19 may be constructed in such manner that its energization is only sufficient to maintain the relay 12 closed after it is once actuated. Since the current coil 18 is bridged upon the closing of the accelerating switch 8, the coil 19 alone maintains the relay closed and a subsequent reduction of the motor-field magnetization to a dangerously small value effects the opening of the relay 12 to interrupt the main motor circuit.

Although I have described a simple and preferred application of my invention to a control system for a direct-current motor, it is not necessarily so limited and I desire, therefore, that only such limitations shall be imposed as are indicated by the spirit and scope of the appended claims.

I claim as my invention:

1. In a motor-control system, the combination with a motor having an armature and a shunt field-magnet winding, a line switch for governing the motor operation and a starting resistor for said motor, of a relay device for controlling said line switch and having an actuating coil in series relation with said armature for initially closing the relay device, and a switch for simultaneously shunting a portion of said resistor and rendering said coil ineffective, said relay device also having a holding coil connected in circuit with said field-magnet winding for maintaining the relay device and the line switch closed unless a predetermined minimum energization of said field-magnet winding obtains.

2. In a motor-control system, in combination with a motor having an armature and a shunt field-magnet winding, a line switch for governing the motor operation and a starting resistor for said motor, said line switch having an actuating coil and an auxiliary contact member, of a relay device for controlling said line switch and having an actuating coil in series relation with said armature for initially closing the relay device, a push-button device for initially and temporarily effecting the energization of the actuating coil of said line switch, said relay device, after the closure of said line switch, serving to maintain the actuating coil of said line switch energized through said auxiliary contact member upon the release of said push-button, and a switch for simultaneously shunting a portion of said resistor and thereby rendering said actuating coil of said relay device ineffective, said relay device also having a holding coil connected in circuit with said field-magnet winding for maintaining the relay device and the line switch closed unless a predetermined minimum energization of said field-magnet winding obtains.

3. The combination with a motor having series and shunt field windings, of a line switch for controlling the motor and comprising an operating coil controlled in accordance with current traversing said shunt field winding under normal operating conditions and means responsive to current traversing said series winding for rendering said coil independent of shunt field current during acceleration.

4. The combination with a motor having series and shunt field windings, and a line switch for governing the motor operation, of a relay normally controlled in accordance with the energization of the shunt field winding for controlling the line switch, and means responsive to current traversing the series field winding for controlling said relay independently of the shunt-field excitation during acceleration.

In testimony whereof, I have hereunto subscribed my name this 20th day of February, 1920.

ALBERT L. HARVEY.